A. MICELI.
DUMP CAR.
APPLICATION FILED SEPT. 3, 1918.

1,292,627.

Patented Jan. 28, 1919.
2 SHEETS—SHEET 1.

Inventor
Antonino Miceli.
By Upsell, Kearney Freed
Attorneys.

A. MICELI.
DUMP CAR.
APPLICATION FILED SEPT. 3, 1918.

1,292,627.

Patented Jan. 28, 1919.
2 SHEETS—SHEET 2.

Inventor.
Antonino Miceli
By Yursell, Keeney & French
Attorneys

UNITED STATES PATENT OFFICE.

ANTONINO MICELI, OF BROOKLYN, NEW YORK.

DUMP-CAR.

1,292,627. Specification of Letters Patent. Patented Jan. 28, 1919.

Application filed September 3, 1918. Serial No. 252,388.

*To all whom it may concern:*

Be it known that I, ANTONINO MICELI, a citizen of the United States, and resident of Brooklyn, in the county of Kings and State of New York, have invented new and useful Improvements in Dump-Cars, of which the following is a description, reference being had to the accompanying drawings, which are a part of this specification.

The invention relates to dump cars more particularly designed for use on railroads for quickly discharging bulk material from flat cars and is fully described and explained in the specification and shown in the accompanying drawings in which.

Figure 1:
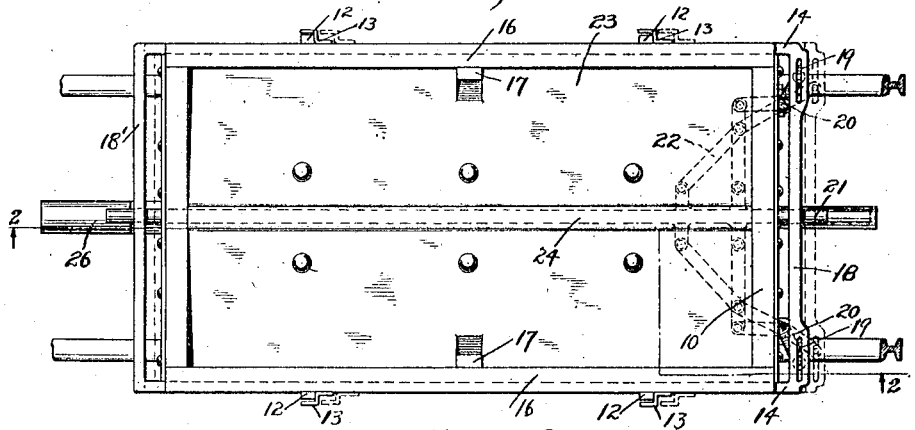
Figure 1 is a plan view of the car embodying the invention.
Figure 2:
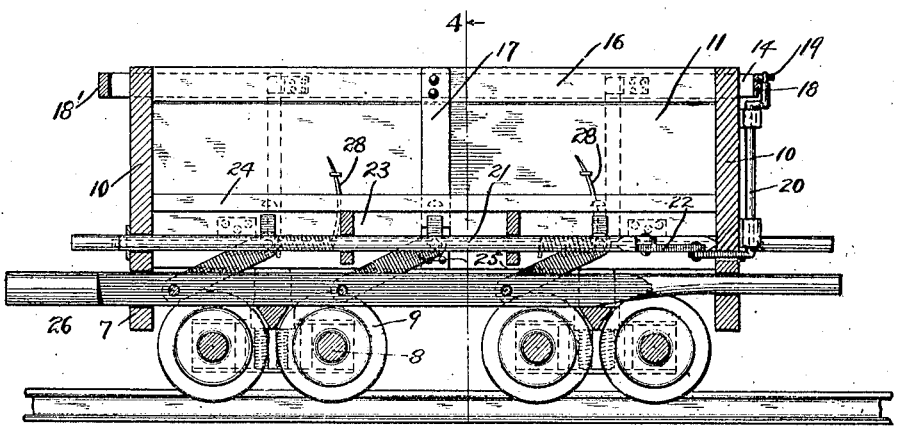
Fig. 2 is a section taken on the line 2—2 of Fig. 1.
Figure 3:
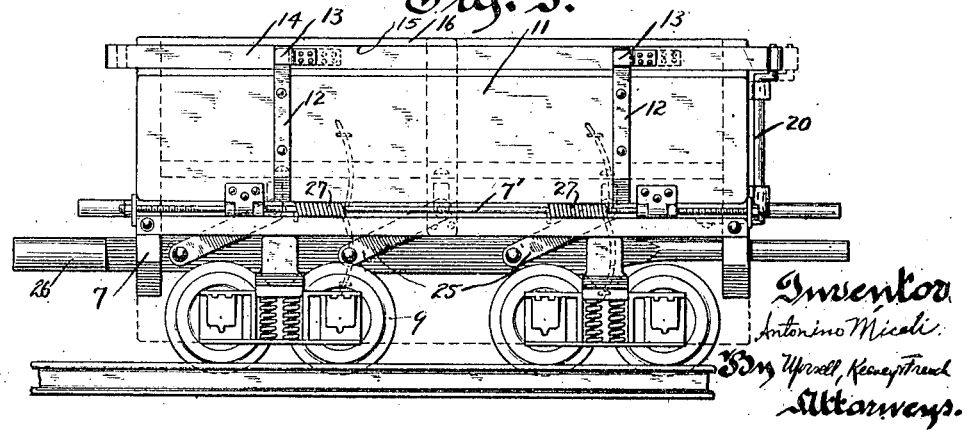
Fig. 3 is a side view of the car.

In the drawings, the numeral 7 designates the frame of the car, 8 the axles, 9 the wheels and 10 the ends of the car, all of usual construction.

Each side 11 is hingedly secured to rods 7' carried by the frame 7 and both sides are normally held locked in upright position by means of upwardly projecting bars 12 on these sides engaged by angular locking lugs 13 carried by bars 14 slidably mounted in guideways 15 in upper side frame members 16 secured at their ends to the ends of the car and intermediate their ends to uprights 17. The bars 14 are moved together by means of transverse members 18 and 18' connected or formed integral with the bars 14, the member 18 being provided with slots 19 receiving the upper ends of cranked rods 20 which are connected to a sliding actuating bar 21 by means of links 22 whereby on a movement of bar 21 toward said cranked rods 20 the member 18 and bars 14 will be moved outwardly thus disconnecting the lugs 13 from the bars 12 and on a reverse movement of said bar 21 the sides will be held in locked position.

The bottom of the car is constructed of two bottom portions 23 hingedly connected on their outer sides to the rods 7' and normally inclined upwardly and meeting a fixed central bottom frame member 24 to limit their downward movement.

Figure 4:
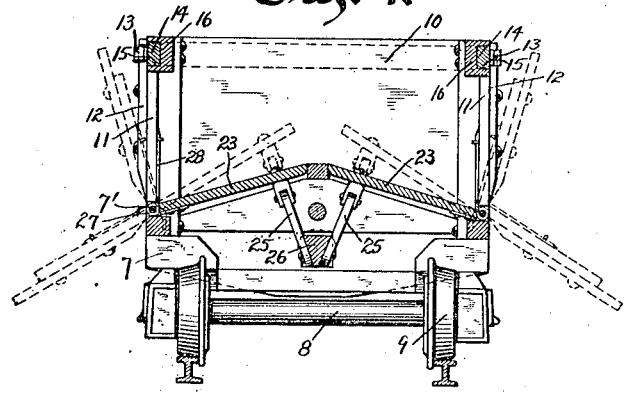
Fig. 4 is a section taken on the line 4—4 of Fig. 2.
Figure 5:
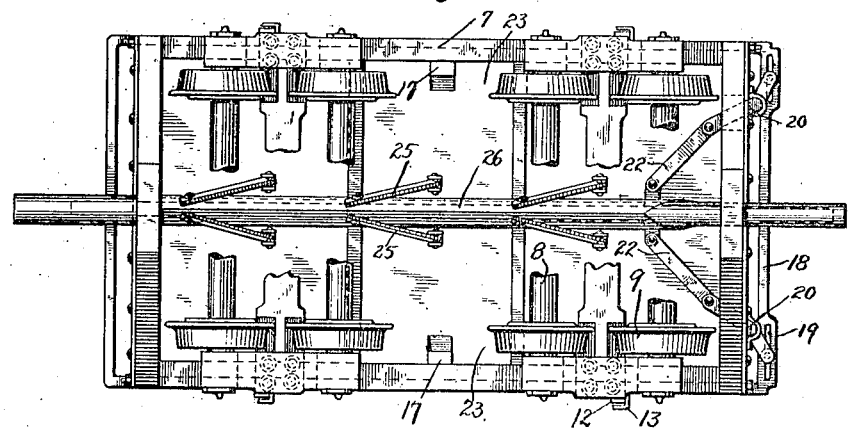
Fig. 5 is a bottom view of the device.
Figure 6:
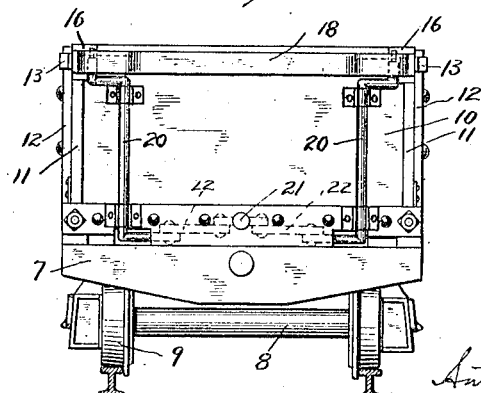
Fig. 6 is a view of one end of the car.

Means are provided for swinging these bottom portions upwardly, to discharge the contents of the car, consisting of a plurality of links 25 pivotally connected at one of their ends to the bottom portions and pivotally connected at their other ends to an actuating bar 26 slidably mounted in the frame 7. With this construction when the bar 26 is moved toward the member 18, the links 25 will move upwardly and raise the bottom portions 23 to the dotted line position shown in Fig. 4.

The sides 11 are normally moved to upright position by means of springs 27 connected at one of their ends 28 to the inner sides of the sides 11 and at their other ends to the frame 7. As the bottom portions 23 are raised upward their outer sides press against the ends 28 of the springs 27 relieving the spring pressure and causing the sides 11 to move outwardly to the upper dotted line position shown in Fig. 4 after which the weight of the material in the car swings the doors downwardly to the lower dotted line position shown in Fig. 4 and the load slides down the inclined platforms formed by the bottom portions 23 and sides 11 and is discharged from the car. Then the springs 27 move the doors back to the upper dotted line position and a return of the bottom portions releases the pressure on the springs and the sides are moved to upright position.

From the foregoing explanation it will be noted that the device is simple and well adapted for the purpose described.

I am aware that the details of construction herein set forth may be changed and I therefore desire it to be understood that such changes as come within the scope of the appended claims are within the spirit of my invention.

What I claim as my invention is:

1. In a dump car, the combination, with the car frame, of a two-part bottom comprising bottom portions hingedly connected at their outer sides to the sides of the frame, an actuating member slidably mounted upon the frame, and links operatively connecting said bottom portions to said actuating member to swing the inner ends of said bottom portions upwardly on the movement of said member.

2. In a dump car, the combination, with the car frame, of sides hingedly connected at their lower ends to said frame, springs normally maintaining said sides in upright position, means for locking said sides in upright position, means for relieving the pressure of the springs on said sides when unlocked to permit said doors to tilt downwardly to discharge the load.

3. In a dump car, the combination, with a car frame, of sides hingedly connected thereto at their lower ends, springs normally maintaining said sides in upright position, means for locking said sides in upright position, a two-part bottom comprising bottom portions hingedly connected at their outer sides to the sides of the frame, means for tipping said bottom portions upwardly, and means on said bottom portions engaging said springs on their upward movement to relieve the pressure of said springs upon the sides and permit said sides to move downwardly, when unlocked, to discharge the load.

4. In a dump car, the combination with a car frame, of sides hingedly connected thereto at their lower ends, springs normally maintaining said sides in upright position, means for locking said sides in upright position, upwardly inclined bottom portions hingedly connected at their outer edges to said frame, means for tipping said bottom portions upwardly, the outer edges of said bottom portions, when swung upwardly, engaging said springs to relieve their pressure against the sides to allow said sides to move downwardly to discharge the load.

5. In a dump car, the combination, with the car frame, of sides hingedly connected thereto at their lower edges, bottom members hingedly connected thereto at their outer edges, means for moving said bottom members upwardly to discharge the load, and means actuated in the upward movement of said bottom members for swinging said sides outwardly to discharge the load.

6. In a dump car, the combination, with the car frame, of sides hingedly connected thereto at their lower edges, bottom members hingedly connected thereto at their outer edges, means for moving said bottom members upwardly to discharge the load, means actuated on the upward movement of said bottom members for swinging said sides outwardly to discharge the load, and means for automatically returning said sides to upright position when said bottom members are swung downwardly.

In testimony whereof, I affix my signature.

ANTONINO MICELI.

Copies of this patent may be obtained for five cents each, by addressing the "Commissioner of Patents, Washington, D. C."